(12) United States Patent
Neelakantan et al.

(10) Patent No.: US 8,425,378 B2
(45) Date of Patent: Apr. 23, 2013

(54) DUAL GAIN CLUTCH CONTROL SYSTEM

(75) Inventors: Vijay A. Neelakantan, Rochester Hills, MI (US); Todd C. Schanz, Willis, MI (US); Robert L. Moses, Ann Arbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 814 days.

(21) Appl. No.: 12/474,338

(22) Filed: May 29, 2009

(65) Prior Publication Data

US 2010/0304927 A1 Dec. 2, 2010

(51) Int. Cl.
*B60W 10/00* (2006.01)
(52) U.S. Cl.
USPC .......................................................... 477/70
(58) Field of Classification Search ............. 477/70, 477/79, 180, 143, 146, 149, 155, 158, 163, 477/164; 192/85.63, 3.57, 3.58
See application file for complete search history.

(56) References Cited

U.S. PATENT DOCUMENTS

| | | | | |
|---|---|---|---|---|
| 5,281,190 A * | 1/1994 | Koivunen | ...................... | 475/116 |
| 6,024,663 A * | 2/2000 | Suzuki et al. | .................. | 475/123 |
| 6,155,396 A * | 12/2000 | Tsubata et al. | ............. | 192/85.63 |
| 6,508,741 B1 * | 1/2003 | Murakami et al. | .............. | 477/95 |
| 6,591,958 B1 * | 7/2003 | Moorman | .................. | 192/85.63 |

* cited by examiner

*Primary Examiner* — David D Le
*Assistant Examiner* — David J Hlavka
(74) *Attorney, Agent, or Firm* — Quinn Law Group, PLLC

(57) ABSTRACT

An automatic transmission includes a control system for controlling a clutch of the transmission. The control system includes a first variable flow solenoid and a second variable flow solenoid, each in selective fluid communication with the clutch. The first variable force solenoid provides hydraulic fluid within a first pressure range of 0 and 1,000 kPa. The second variable force solenoid provides hydraulic fluid within a second pressure range of 0 and 2,000 kPa. A transmission controller sends an electrical signal having a current between the range of 0 and 1 amp to one of the first and second variable flow solenoids. The pressure output of each of the first and second variable force solenoids is a function of, within their respective first and second pressure ranges, the amplitude of the current of the electrical signal to provide two distinct power gains to the single clutch.

10 Claims, 2 Drawing Sheets

DUAL GAIN CLUTCH CONTROL SYSTEM

TECHNICAL FIELD

The subject invention generally relates to an automatic transmission, and more specifically, to a control system for controlling a clutch in the automatic transmission.

BACKGROUND OF THE INVENTION

Automatic transmissions utilize a planetary geartrain and a plurality of coupling devices, i.e., clutches, to provide a plurality of different gear ratios, i.e., gear positions. In automatic transmissions having six (6) or more gear ratios, a single clutch is often utilized in multiple shifting operations to facilitate shifting between multiple gear ratios. For example, in a six speed automatic transmission, a single clutch may be utilized in independent shifting operations to shift the automatic transmission into a third gear ratio, a fifth gear ratio and a reverse gear ratio.

Each of these different shifting operations requires a different piston force, i.e., a different gain, applied to the single clutch in order to achieve a smooth shift into each of the different gear ratios. For example, in the six speed automatic transmission described above, a single clutch requires a lower piston force applied thereto, i.e., a higher gain, to shift into the third gear ratio than the fifth gear ratio, in order to achieve a similarly smooth shift into each of the different gear ratios. Therefore, higher resolution in pressure control is desired in controlling high gain clutches.

SUMMARY OF THE INVENTION

A control system for an automatic transmission is provided. The automatic transmission includes an input member and an output member. The control system includes a coupling device configured for selectively interconnecting the input member and the output member in response to a fluid pressure applied by a hydraulic fluid. The coupling device facilitates shifting between a plurality of gear ratios. A first control mechanism is in selective fluid communication with the coupling device. The first control mechanism is configured for supplying the hydraulic fluid to the coupling device at a pressure within a first pressure range to actuate the coupling device at a first gain. A second control mechanism is in selective fluid communication with the coupling device. The second control mechanism is configured for supplying the hydraulic fluid to the coupling device at a pressure within a second pressure range to actuate the coupling device at a second gain. The first pressure range is different from the second pressure range, and the first gain is different from the second gain.

An automatic transmission includes an input member, an output member, and a clutch. The clutch is configured for selectively interconnecting the input member and the output member in response to a fluid pressure applied by a hydraulic fluid to facilitate shifting between a plurality of gear ratios. A first variable force solenoid is in selective fluid communication with the clutch. The first variable force solenoid is configured for supplying the hydraulic fluid to the clutch at a pressure within a first pressure range to actuate the clutch at a first gain. A second variable force solenoid is in selective fluid communication with the clutch. The second variable force solenoid is configured for supplying the hydraulic fluid to the clutch at a pressure within a second pressure range to actuate the clutch at a second gain. The first pressure range is different from the second pressure range, and the first gain is different from the second gain. A transmission controller is coupled to the first variable force solenoid and the second variable force solenoid. The transmission controller is configured for sending an electrical signal having a variable current between a pre-determined range to each of the first variable force solenoid and the second variable force solenoid. A pressure of the hydraulic fluid from each of the first variable force solenoid and the second variable force solenoid within the first pressure range and the second pressure range respectively is a function of an amplitude of the variable current of the electrical signal within the pre-determined range.

A method of controlling an automatic transmission is also provided, wherein the automatic transmission includes a coupling device actuated by a pressure applied by a hydraulic fluid for selectively interconnecting an input member and an output member. The coupling device is in selective fluid communication with a first control mechanism and a second control mechanism. The method includes signaling the first control mechanism to supply the hydraulic fluid to the coupling device at a pressure within a first pressure range to actuate the coupling device at a first gain. The method further includes signaling the second control mechanism to supply the hydraulic fluid to the coupling device at a pressure within a second pressure range, when the hydraulic fluid from the first control mechanism is at a maximum level within the first pressure range, to actuate the coupling device at a second gain.

Accordingly, the automatic transmission includes the first control mechanism for applying a fluid pressure to the coupling device at a pressure within the first pressure range at the first gain, and includes the second control mechanism for applying a fluid pressure to the coupling device at a pressure within the second pressure range at the second gain. Thus, the single coupling device of the subject invention is operable at both the first gain and the second gain to facilitate the single coupling device shifting into different gear ratios smoothly. The subject invention increases the controllability of the coupling device to provide greater control granularity of the coupling device to achieve a consistently smoother shift into the various different gear ratios, wherein each gear ratio requires a different gain to shift smoothly.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
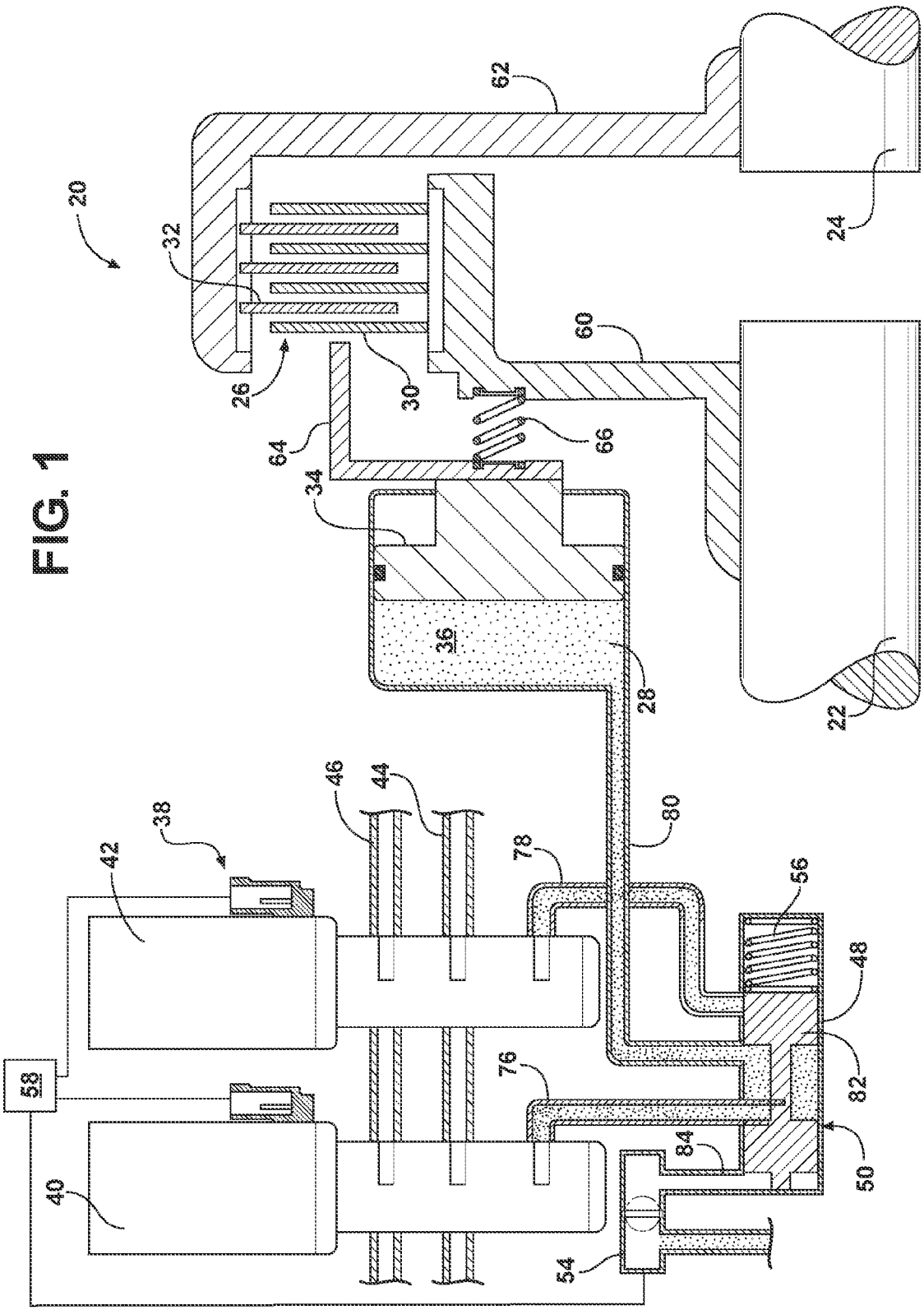
FIG. 1 is a schematic cross sectional view of a first embodiment of an automatic transmission showing a first control mechanism in fluid communication with a coupling device.

Referring to FIG. 1, an automatic transmission is shown generally at 20. The automatic transmission 20 is operable in a plurality of gear ratios, i.e. gear positions. The automatic transmission 20 includes an input member 22, an output member 24 and at least one coupling device 26. The input member 22 includes an input flange 60 and the output member 24 includes an output flange 62, with the coupling device 26 selectively interconnecting the input flange 60 and the output flange 62 of the input member 22 and the output member 24 respectively. The at least one coupling device 26, i.e., a single coupling device 26, selectively interconnects the input member 22 and the output member 24 when actuated to facilitate shifting between at least two (2) of the various gear ratios. Because of the various operating conditions, e.g., engine speed, wheel speed, throttle speed, etc., in which the single coupling device 26 must operate to shift between the two (2) gear ratios, each of the gear ratios in which the coupling device 26 is utilized to interconnect the input member 22 and the output member 24 requires a different gain applied to the coupling device 26 in order to achieve a smooth shift.

The coupling device 26 is configured for selectively interconnecting the input member 22 and the output member 24 in response to a fluid pressure applied by a hydraulic fluid 28. The coupling device 26 preferably includes a hydraulically actuated clutch. The clutch includes a plurality of driving clutch plates 30 attached to the input member 22, and a plurality of driven clutch plates 32 attached to the output member 24. Specifically, the driving clutch plates 30 are attached to the input flange 60 and the driven clutch plates 32 are attached to the output flange 62. The clutch further includes a clutch piston 34 and a hydraulic chamber 36. The clutch piston 34 is moveable in response to the fluid pressure applied by the hydraulic fluid 28. A clutch extension 37 is attached to and moveable with the clutch piston 34. When actuated, the clutch piston 34 and the attached piston extension 64 move the driving clutch plates 30 into frictional engagement with the driven clutch plates 32. The clutch includes a clutch spring 66 configured to bias the piston extension 64 away from the driving clutch plates 30 and the driven clutch plates 32 to release the frictional engagement therebetween. It should be appreciated that the coupling device 26 may include some other device not shown or described herein that is capable of selectively interconnecting the input member 22 and the output member 24.

The automatic transmission 20 includes a control system 38 for controlling the coupling device 26. The control system 38 controls a pressure force, applied to the coupling device 26. The control system 38 directs a first control mechanism 40 to apply controllable pressure to the coupling device 26 to shift the transmission 20 into one of the gear ratios, and directs a second control mechanism 42 to apply controllable pressure to the coupling device 26 to shift the transmission 20 into another of the gear ratios. Accordingly, the control system 38 selectively applies two different pressure ranges for the same current range from two different control mechanisms 40, 42 to the coupling device 26 to permit the same coupling device 26 to be utilized to shift the transmission 20 between several different gear ratios, while maintaining a smooth shift into each gear ratio.

The control system 38 includes a first control mechanism 40 and a second control mechanism 42. The hydraulic chamber 36 of the coupling device 26 is in selective fluid communication with the first control mechanism 40 and the second control mechanism 42. A supply line 44 supplies the first control mechanism 40 and the second control mechanism 42 with the pressurized hydraulic fluid 28 from a reservoir (not shown). A return line 46, i.e., an exhaust line, circulates the hydraulic fluid 28 from the first control mechanism 40 and the second control mechanism 42 back to the reservoir. A pump (not shown) pressurizes and circulates the hydraulic fluid 28 as is well known in the art. The first control mechanism 40 and the second control mechanism 42 regulate the pressure of the hydraulic fluid 28 applied to the coupling device 26; thereby selectively choosing the overall gain from the applied electrical current to the clutch torque of the coupling device 26.

The first control mechanism 40 is in selective fluid communication with the coupling device 26. Selective fluid communication is defined as being in fluid communication when selected. Accordingly, the first control mechanism 40 is in fluid communication with the coupling device 26 when selected, and the first control mechanism 40 is not in fluid communication with the coupling device 26 when not selected.

The first control mechanism 40 is configured to supply the hydraulic fluid 28 to the coupling device 26 at a pressure within a first pressure range to actuate the coupling device 26 at a first gain with a first pressure control resolution. Accordingly, the first control mechanism 40 supplies the hydraulic fluid 28 to the coupling device 26 with a pressure within the first pressure range, with the magnitude of the first gain variable with and dependent upon the pressure of the hydraulic fluid 28 received from the first control mechanism 40. For example, the first pressure range may be between the range of zero (0) and one thousand (1000) kPa. However, it should be appreciated that the first pressure range may include some other pressure range suitable for other applications.

Preferably, the first control mechanism 40 includes a direct acting high flow variable force solenoid. As such, the pressure from the first control mechanism 40 is variable within the first pressure range, with the first gain varying proportionally with the pressure of the hydraulic fluid 28 applied to the coupling device 26. The high flow variable force solenoid of the first control mechanism 40 may include a solenoid portion coupled to and configured for operating a valve spool. The solenoid portion includes a coil wound around a moveable armature. The armature moves linearly in response to an electric current applied to the coil. The linear movement of the armature moves the valve spool. The distance the armature moves and thereby the movement of the valve spool is proportional to the electrical current applied to the coil. The pressure from the first control mechanism 40 varies with the linear movement of the valve spool. Pressure from the first control mechanism 40 varies with the electrical current applied to the first control mechanism 40. It should be appreciated that the first control mechanism 40 may include some other control device not shown or described herein.

The second control mechanism 42 is in selective fluid communication with the coupling device 26. Selective fluid communication is defined as being in fluid communication when selected. Accordingly, the second control mechanism 42 is in fluid communication with the coupling device 26 when selected, and the second control mechanism 42 is not in fluid communication with the coupling device 26 when not selected.

The second control mechanism 42 is configured for supplying the hydraulic fluid 28 to the coupling device 26 at a pressure within a second pressure range to actuate the coupling device 26 at a second gain with a second pressure control resolution. Accordingly, the second control mechanism 42 supplies the hydraulic fluid 28 to the coupling device 26 with a pressure within the second pressure range, with the magnitude of the second gain variable with and dependent upon the pressure of the hydraulic fluid 28 received from the second control mechanism 42. For example, the second pressure range may be between the range of zero (0) and two thousand (2000) kPa. However, it should be appreciated that the second pressure range may include some other pressure range suitable for other applications. It should be appreciated that the first pressure range is different from the second pressure range and the first gain and resolution is different from the second gain and resolution.

Preferably, the second control mechanism 42 includes a high flow variable force solenoid. As such, the pressure from the second control mechanism 42 is variable within the second pressure range, with the second gain varying proportionally with the pressure of the hydraulic fluid 28 applied to the coupling device 26. The second control mechanism 42 may be similar in construction and operation to the first control mechanism 40, with the difference between the first control mechanism 40 and the second control mechanism 42 being that the second control mechanism 42 provides a pressure between, for example, the range of zero (0) and two thousand (2000) kPa, whereas the first control mechanism 40 provides a pressure between, for example, the range of zero (0) and one thousand (1000) kPa. The pressure from the second control mechanism 42 varies with the electrical current applies to the second control mechanism. 42. It should be appreciated that the second control mechanism 42 may include some other control device not shown or described herein.

The control system 38 may further include a control valve 48. The control valve 48 is in fluid communication with each of the first control mechanism 40, the second control mechanism 42 and the coupling device 26. Specifically, a first fluid line 76 connects the first control mechanism 40 and the control valve 48 in fluid communication, a second fluid line 78 connects the second control mechanism 42 and the control valve 48 in fluid communication, and a third fluid line 80 connects the control valve 48 and the hydraulic chamber 36 in fluid communication. The control valve 48 selectively directs the hydraulic fluid 28 from one of the first control mechanism 40 and the second control mechanism 42 to the coupling device 26 when required to apply one of the first gain and the second gain to the coupling device 26.

The control valve 48 includes and is operable between a first position 50 and a second position. The control valve 48 is shown in FIG. 1 in the the first position 50. The first position 50 is configured for directing the hydraulic fluid 28 between the first control mechanism 40 and the coupling device 26. The second position 52 is configured for directing the hydraulic fluid 28 between the second control mechanism 42 and the coupling device 26. Specifically, the control valve 48 includes a control valve piston 82 that is axially moveable between the first position 50 and the second position. When the control valve piston 82 is in the first position 50, the control valve 48 opens fluid communication between the first fluid line 76 and the third fluid line 80, and closes fluid communication between the second fluid line 78 and the third fluid line 80. When the control valve piston 82 is in the second position, the control valve 48 opens fluid communication between the second fluid line 78 and the third fluid line 80, and closes fluid communication between the first fluid line 76 and the third fluid line 80.

An on/off control device 54 is coupled to the control valve 48. The on/off control device 54 is configured to actuate the control valve 48 between the first position 50 and the second position. Accordingly, when signaled, the on/off control device 54 switches between the first position 50 and the second position 52 to apply one of the first gain and the second gain to the coupling device 26 for the specific shifting operation being performed.

Figure 2:
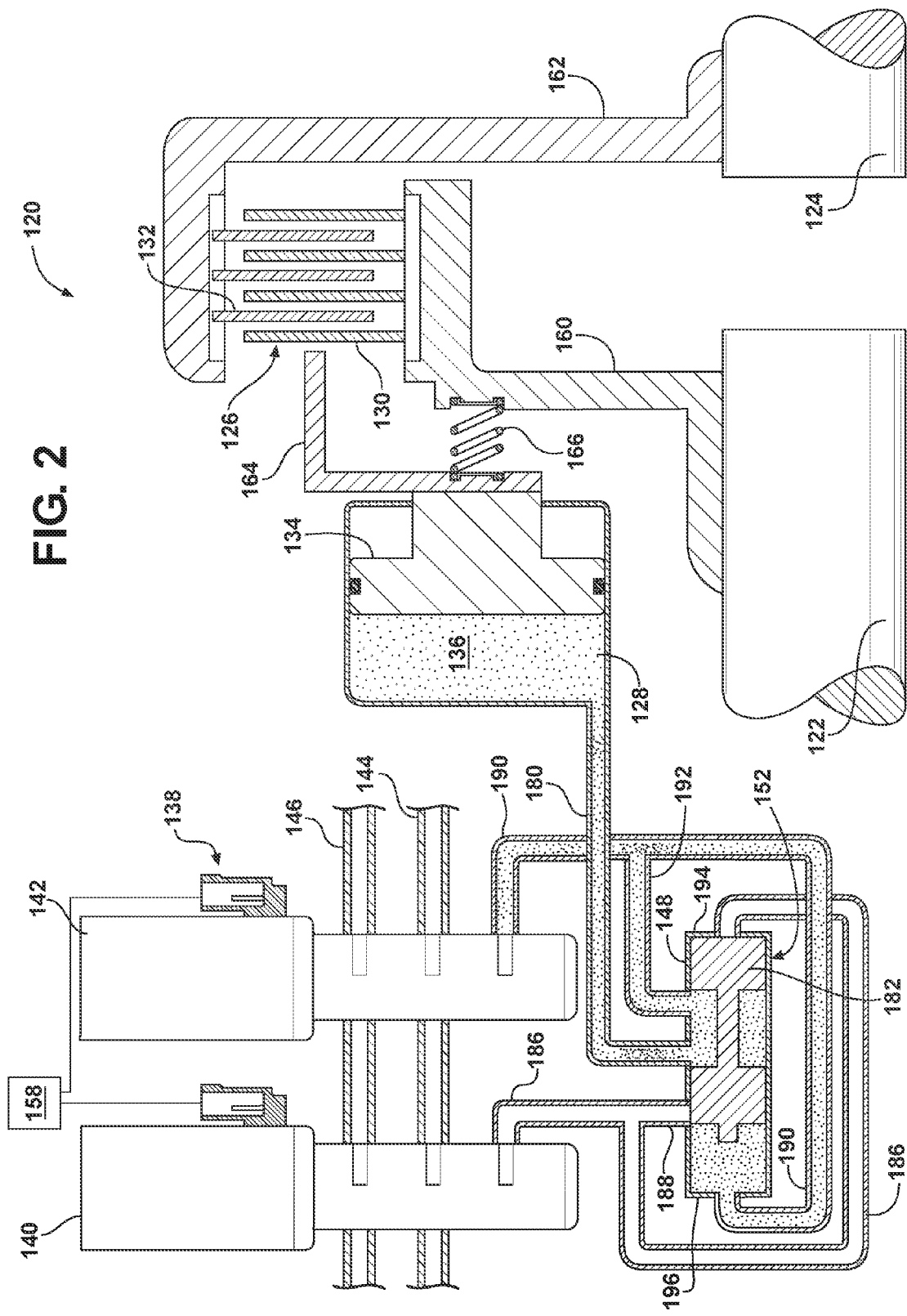
FIG. 2 is a schematic cross sectional view of a second embodiment of the automatic transmission showing a second control mechanism in fluid communication with the coupling device.

As shown, the on/off control device 54 may include an electronically actuated hydraulic valve. As such, when turned to an "on" position, the electronically actuated hydraulic valve allows pressurized hydraulic fluid 28 to flow through a fourth fluid line 84 into the control valve 48 to urge the control valve piston 82 the control valve 48 into the second position to open fluid communication between the second control mechanism 42 and the coupling device 26 and close fluid communication between the first control mechanism 40 and the coupling device 26. When turned to an "off" position, such as is shown in FIG. 2, a spring 56 in the control valve 48 biases the control valve piston 82 of the control valve 48 into the first position 50 to open fluid communication between the first control mechanism 40 and the coupling device 26 and close fluid communication between the second control mechanism 42 and the coupling device 26. It should be appreciated that the on/off control device 54 may include some other device and/or switch not shown or described herein that is capable of actuating the control valve 48 between the first position 50 and the second position 52.

The control system 38 further includes a transmission controller 58. The transmission controller 58 is configured for sending an electrical signal to the first control mechanism 40 and the second control mechanism 42. The transmission controller 58 is preferably integral with the transmission 20, but may alternatively be remote from the transmission 20 and electronically coupled to the transmission 20. The transmission 20 signals actuation of the first control mechanism 40 and the second control mechanism 42, as well as the on/off control device 54 is the transmission 20 is so equipped.

The transmission controller 58 sends an electrical signal to each of the first control mechanism 40 and the second control mechanism 42. The electrical signal includes a variable current, i.e., a current having a magnitude that varies, with the current being within a pre-determined range. The pressure of the hydraulic fluid 28 received from each of the first control mechanism 40 and the second control mechanism 42 is a function of the amplitude of the variable current of the electrical signal within the first pressure range and the second pressure range respectively. In other words, as the amplitude of the current of the electrical signal varies within the pre-determined range, the pressure of the hydraulic fluid 28 received from the first control mechanism 40 and the second control mechanism 42 varies proportionally to the amplitude of the current of the electrical signal within the first pressure range and the second pressure range respectively.

As noted above, the amplitude of the variable current of the electrical signal varies within the pre-determined range. Preferably, the amplitude of the variable current of the electrical signal varies between the pre-determined range of zero (0) and one (1) amp for each of the first control mechanism 40 and the second control mechanism 42. In other words, the amplitude of the current of the electrical signal for both of the first control mechanism 40 and the second control mechanism 42 varies between, for example, the range of zero (0) and one (1) amp. It should be appreciated that the pre-determined range may include a different range from that disclosed herein in accordance with specific equipment and design requirements.

In operation, the transmission controller 58 senses which of the different shifting operation is to be performed by the single coupling device 26 and the current driving conditions, and determines which of the first gain and the second gain needs to be applied to the coupling device 26 in order to achieve a smooth shift into the respective gear ratio under the current driving conditions. The transmission controller 58 then signals the appropriate one of the first control mechanism 40 and the second control mechanism 42 to open fluid communication with the coupling device 26 to provide the hydraulic fluid 28 thereto. If equipped with the on/off control device 54, the transmission controller 58 also signals the on/off control device 54 to position the control valve 48 in the appropriate one of the first position 50 and the second position 52 to allow the fluid flow from one of the first control mechanism 40 and the second control mechanism 42 to the coupling device 26.

Referring to FIG. 2, a second embodiment of the transmission is shown generally at 120. Throughout this application, the elements of the second embodiment of the transmission 120 that are similar to the elements of the first embodiment of the transmission 20 include the same reference numeral increased by one hundred. For example, the first control mechanism, identified by the reference numeral 40 in the first embodiment of the transmission 20, is identified by the reference numeral 140 in the second embodiment of the transmission 120.

The second embodiment of the transmission 120 includes a control system 138 having a control valve 148, in which the control valve 48 is not controlled by the on/off control device 54. In the second embodiment of the transmission 120, the control valve 148 is in fluid communication with the first control mechanism 140 at a first pressure, and is in fluid communication with the second control mechanism 142 at a second pressure. Specifically, a fifth fluid line 186 connects the first control mechanism 140 with a first end 194 of the control valve 148 to exert an axial pressure force on the control valve piston 182 in a first direction to urge the control valve piston 182 into a first position. A sixth fluid line 188 connects the fifth fluid line 186 and the control valve 148, with the sixth fluid line 188 in fluid communication with a third fluid line 180 when the control valve 148 is in the first position. A seventh fluid line 190 connects the second control mechanism 142 with a second end 196 of the control valve 148 to exert an axial pressure force on the control valve piston 182 in a second direction opposite the first direction to urge the control valve piston 182 into a second position 152. An eighth fluid line 192 connects the seventh fluid line 190 and the control valve 148 in fluid communication, with the eighth fluid line 192 in fluid communication with the third fluid line 180 when the control valve 148 is in the second position 152.

The control valve 148 is moveable between the first position and the second position 152 in response to a difference between the first pressure and the second pressure. Accordingly, if the first control mechanism 140 is directing the hydraulic fluid 128 to the control valve 148 and the second control mechanism 142 is not, then the pressure of the hydraulic fluid 128 from the first control mechanism 140 moves the control valve 148 into the first position to open fluid communication between the first control mechanism 140 and the coupling device 126. Similarly, if the second control mechanism 142 is directing the hydraulic fluid 128 to the control valve 148 and the first control mechanism 140 is not, then the pressure of the hydraulic fluid 128 from the second control mechanism 142 moves the control valve 148 into the second position 152, as is shown in FIG. 2, to open fluid communication between the second control mechanism 142 and the coupling device 126. It should be appreciated that in the second embodiment of the transmission 120, the controller 158 may signal both the first control mechanism 140 and the second control mechanism 142 to simultaneously direct flow to the control valve 148, in which case the control valve 148 is actuated accordingly by the pressure differential therebetween.

A method of controlling the automatic transmission 20, 120 is also provided. The method selectively pressurizes a coupling device 26, 126, e.g., a hydraulically actuated clutch, with a first control mechanism 40, 140, e.g., a first solenoid, and a second control mechanism, 42, 142, e.g., a second solenoid, with different pressure ranges for each control mechanism with the same electrical current applied to each of the control mechanisms.

The method includes signaling the first control mechanism 40, 140 to supply the hydraulic fluid 28, 128 to the coupling device 26, 126 at a pressure within the first pressure range to actuate the coupling device 26, 126 at the first gain. As described above, the first pressure range is, for example, between the range of zero (0) kPa and one thousand (1,000) kPa.

Signaling the first control mechanism 40, 140 may further be defined as sending an electrical signal having a current within a pre-determined range to the first control mechanism 40, 140. Sending the electrical signal having a current within a pre-determined range to the first control mechanism 40, 140 may further be defined as sending an electrical signal having a current between, for example, the range of zero (0) and one (1) amp to the first control mechanism 40, 140.

As described above, the electrical signal actuates the first control mechanism 40, 140 to open fluid communication with the coupling device 26, 126 to provide the hydraulic fluid 28, 128 thereto. The pressure of the hydraulic fluid 28, 128 is a function of the amplitude of the current of the electrical signal. Accordingly, the pressure varies between, for example, the range of zero (0) kPa and one thousand (1,000) kPa proportionally as the amplitude of the current of the electrical signal varies between, for example, the range of zero (0) and one (1) amp. It should be appreciated that the first gain varies proportionally with the pressure applied by the hydraulic fluid 28, 128 supplied by the first control mechanism 40, 140 to the coupling device 26, 126.

The method further includes signaling the second control mechanism 42, 142 to supply the hydraulic fluid 28, 128 to the coupling device 26, 126 at a pressure within a second pressure range, when the hydraulic fluid 28, 128 from the first control mechanism 40, 140 is at a maximum level within the first pressure range, to actuate the coupling device 26, 126 at a second gain. As described above, the second pressure range is between, for example, the range of zero (0) kPa and two thousand (2,000) kPa.

Signaling the second control mechanism 42, 142 may further be defined as sending an electrical signal having a current within the pre-determined range to the second control mechanism 42, 142. Sending the electrical signal having a current within a pre-determined range to the second control mechanism 42, 142 may further be defined as sending an electrical signal having a current between, for example, the range of zero (0) and one (1) amp to the second control mechanism 42, 142.

As described above, the electrical signal actuates the second control mechanism 42, 142 to open fluid communication with the coupling device 26, 126 to provide the hydraulic fluid 28, 128 thereto. The pressure of the hydraulic fluid 28, 128 is a function of the amplitude of the current of the electrical signal. Accordingly, the pressure varies between, for example the range of zero (0) kPa and two thousand (2,000) kPa proportionally as the amplitude of the current of the electrical signal varies between, for example, the range of zero (0) and one (1) amp. It should be appreciated that the second gain varies proportionally with the pressure applied by the hydraulic fluid 28, 128 supplied by the second control mechanism 42, 142 to the coupling device 26, 126.

Sending an electrical signal having a current between the range of zero (0) and one (1) amp to the first control mechanism 40, 140 may further be defined as sending an electrical signal having a current, for example, equal to one (1) amp to the first control mechanism 40, 140 prior to signaling the second control mechanism 42, 142. In this manner, the entire range of the first control mechanism 40, 140, and the first gain achieved therefrom, may be utilized prior to switching to the range of the second control mechanism 42, 142, and the second gain achieved therefrom.

Sending an electrical signal having a current between the range of zero (0) and one (1) amp to the second control mechanism 42, 142 may be further defined as sending an electrical signal having a current equal to one half (0.5) amp after sending the electrical signal having a current, for example, equal to one (1) amp to the first control mechanism 40, 140. In this manner, the control system 38, 138 may be configured so that the pressure of the hydraulic fluid 28, 128 from the first control mechanism 40, 140 when the amplitude of the current of the electrical signal, for example, is one (1) amp, is substantially equal to the pressure of the hydraulic fluid 28, 128 from the second control mechanism 42, 142 when the amplitude of the current of the electrical signal, for example, is one half (0.5) amp. Such a configuration permits efficient switching between the first control mechanism 40, 140 and the second control mechanism 42, 142.

The method may further include increasing the magnitude of the current applied to the second control mechanism 42, 142 from, for example, one half (0.5) amp to within a range between the values of one half (0.5) and one (1) amp to increase the pressure applied by the hydraulic fluid 28, 128 to the coupling device 26, 126 beyond the pressure applied by the first control mechanism 40, 140. In this manner, the gain achieved from the first control mechanism 40, 140 and the second control mechanism 42, 142 may be effectively combined to provide a two-stage gain profile.

If the automatic transmission 20, 120 includes a control valve 48, 148 having a first position 50 interconnecting the first control mechanism 40, 140 and the coupling device 26, 126 and a second position 152 interconnecting the second control mechanism 42, 142 and the coupling device 26, 126, then the method may further include actuating the control valve 48, 148 to switch between the first position and the second position of the control valve 48, 148. As described above in the first embodiment of the automatic transmission 20 shown in FIG. 1, the on/off control device 54 may be signaled to switch the control valve 48. Alternatively, as described above in the second embodiment of the automatic transmission 120 shown in FIG. 2, the control valve 148 may be sensitive to the fluid pressure between the control valve 148 and the first control mechanism 140 and the second control mechanism 142 such that a pressure difference therebetween switches the control valve 148 between the first position and the second position.

While the best modes for carrying out the invention have been described in detail, those familiar with the art to which this invention relates will recognize various alternative designs and embodiments for practicing the invention within the scope of the appended claims.

The invention claimed is:

1. A control system for an automatic transmission having an input member and an output member, the control system comprising:
    a coupling device configured for selectively interconnecting the input member and the output member in response to a fluid pressure applied by a hydraulic fluid to facilitate shifting between a plurality of gear ratios;
    a first control mechanism in selective fluid communication with said coupling device and supplying the hydraulic fluid to said coupling device at a pressure within a first pressure range to actuate said coupling device at a first gain; and
    a second control mechanism in selective fluid communication with said coupling device and supplying the hydraulic fluid to said coupling device at a pressure within a second pressure range to actuate said coupling device at a second gain, wherein said first pressure range is different from said second pressure range and said first gain is different from said second gain.

2. A control system as set forth in claim 1 wherein said first pressure range is between the range of zero (0) and one thousand (1000) kPa and said second pressure range is between the range of zero (0) and two thousand (2000) kPa.

3. A control system as set forth in claim 2 wherein said first control mechanism and said second control mechanism each include a direct acting high flow variable force solenoid.

4. A control system as set forth in claim 1 wherein said first control mechanism and said second control mechanism each receives an electrical signal having a variable current, wherein the pressure of the hydraulic fluid is proportional to an amplitude of said variable current of said electrical signal within said first pressure range and said second pressure range respectively.

5. A control system as set forth in claim 4 wherein said amplitude of said variable current of said electrical signal is between the range of zero (0) and one (1) amp for each of said first control mechanism and said second control mechanism.

6. A control system as set forth in claim 5 further comprising a controller configured for sending said electrical signal to said first control mechanism and said second control mechanism.

7. A control system as set forth in claim 1 further comprising a control valve in fluid communication with each of said first control mechanism, said second control mechanism and said coupling device, wherein said control valve is operable between a first position and a second position with said first position configured for directing the hydraulic fluid between said first control mechanism and said coupling device and said second position configured for directing the hydraulic fluid between said second control mechanism and said coupling device.

8. A control system as set forth in claim 7 further comprising an on/off control device coupled to said control valve and configured for actuating said control valve between said first position and said second position of said control valve.

9. A control system as set forth in claim 7 wherein said control valve is in fluid communication with said first control mechanism at a first pressure and in fluid communication with said second control mechanism at a second pressure with said control valve moveable between said first position and said second position in response to a difference between said first pressure and said second pressure.

10. A control system as set forth in claim 1 wherein said coupling device includes a hydraulically actuated clutch having:
    a plurality of driving clutch plates configured for attachment to the input member;
    a plurality of driven clutch plates configured for attachment to the output member; and
    a piston having a hydraulic chamber in selective fluid communication with said first control mechanism and said second control mechanism and moveable in response to the fluid pressure applied by the hydraulic fluid to move said driving clutch plates into frictional engagement with said driven clutch plates.

* * * * *